United States Patent
Chen

(10) Patent No.: US 9,110,241 B2
(45) Date of Patent: *Aug. 18, 2015

(54) PLANAR POLARIZATION ROTATOR

(71) Applicant: Alcatel Lucent, Boulogne Billancourt (FR)

(72) Inventor: Long Chen, Marlboro, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/533,226

(22) Filed: Nov. 5, 2014

(65) Prior Publication Data

US 2015/0063744 A1    Mar. 5, 2015

Related U.S. Application Data

(60) Continuation of application No. 14/069,540, filed on Nov. 1, 2013, now Pat. No. 8,913,854, which is a division of application No. 12/976,554, filed on Dec. 22, 2010, now Pat. No. 8,750,651.

(51) Int. Cl.

| | |
|---|---|
| *G02B 6/10* | (2006.01) |
| *G02B 6/27* | (2006.01) |
| *G02F 1/01* | (2006.01) |
| *G02B 6/126* | (2006.01) |
| *G02B 27/28* | (2006.01) |
| *B29D 11/00* | (2006.01) |
| *G02B 6/136* | (2006.01) |

(52) U.S. Cl.
CPC ........ *G02B 6/2766* (2013.01); *B29D 11/00644* (2013.01); *G02B 6/105* (2013.01); *G02B 6/126* (2013.01); *G02B 27/281* (2013.01); *G02F 1/011* (2013.01); *G02B 6/136* (2013.01)

(58) Field of Classification Search
None
See application file for complete search history.

(56) References Cited

U.S. PATENT DOCUMENTS

| | | |
|---|---|---|
| 2003/0081903 A1 | 5/2003 | Vahala et al. |
| 2003/0223698 A1 | 12/2003 | Nicolaescu |
| 2008/0019637 A1 | 1/2008 | Little et al. |
| 2009/0110344 A1 | 4/2009 | Little et al. |
| 2010/0307678 A1 | 12/2010 | Yokoi |

FOREIGN PATENT DOCUMENTS

| | | |
|---|---|---|
| CN | 1708707 A | 12/2005 |
| CN | 1708718 A | 12/2005 |

(Continued)

OTHER PUBLICATIONS

Kazovsky, L. G., "Phase- and Polarization-Diversity Coherent Optical Techniques", J. Lightwave Technology, vol. 7, Issue 2, 279-292 (1989).

(Continued)

*Primary Examiner* — Jerry Rahll
(74) *Attorney, Agent, or Firm* — John F. McCabe

(57) ABSTRACT

An optical polarization rotator includes first and second optical waveguide ribs located along a planar surface of a substrate. The second optical waveguide rib is located farther from the surface than the first optical waveguide rib. First segments of the optical waveguide ribs form a vertical stack over the substrate, and second segments of the optical waveguide ribs are offset laterally in a direction along the planar surface. The first and second optical waveguide ribs are formed of materials with different bulk refractive indexes.

14 Claims, 9 Drawing Sheets

(56) References Cited

FOREIGN PATENT DOCUMENTS

| CN | 101765796 A | 6/2010 |
|---|---|---|
| JP | 5-323138 A | 12/1993 |
| JP | 10-115724 A | 5/1998 |
| JP | 2000121855 A | 4/2000 |
| JP | 2009-098195 A | 5/2009 |
| JP | 2010-054929 A | 3/2010 |
| KR | 10-2005-0049559 A | 5/2005 |
| KR | 10-2005-0088074 A | 9/2005 |
| TW | 257836 | 9/1995 |
| TW | 344037 | 11/1998 |
| TW | 200405047 | 6/2003 |
| WO | WO 2004/042430 A2 | 5/2004 |
| WO | WO 2004/042458 A1 | 5/2004 |
| WO | WO 2010/095018 A2 | 8/2010 |
| WO | WO 2010095018 A3 | 8/2010 |

OTHER PUBLICATIONS

Darcie, T. E. et al., "Polarisation-Diversity Receiver for Coherent FSK Communications", Electronics Letters, vol. 23, Issue 25, 1369-1371 (1987).

Barwicz, T. et al., "Polarization-transparent microphotonic devices in the strong confinement limit", Nature Photonics, vol. 1, Issue 1, 57-60 (2007).

Fukuda, H. et al., "Silicon photonic circuit with polarization diversity", Optics Express, vol. 16, Issue 7, 4872-4880 (2008).

Doerr, C. R. et al., "Polarization Diversity Waveguide Grating Receiver with Integrated Optical Preamplifiers", IEEE Photonics Technology Letters, vol. 9, Issue 1, 85-87 (1997).

Feng, N. et al., "High speed carrier-depletion modulators with 1.4V-cm V-πL integrated on 0.25um silicon-on-insulator waveguides", Optics Express, vol. 18, Issue 8, 7994-7999 (Mar. 31, 2010).

Vivien, L. et al., "42 GHz p.i.n. Germanium photodetector integrated in a silicon-on-insulator waveguide", Optics Express, vol. 17, Issue 8, 6252-6257 (2009).

Shani, Y. et al., "Integrated optic adiabatic polarization splitter on silicon", Appl. Phys. Lett., vol. 56, Issue 2, 120-121 (1990).

Watts, M. R. et al., "Integrated mode-evolution-based polarization rotators", Optics Letters, vol. 30, Issue 2, 138-140 (2005).

Fukuda, H. et al., "Ultrasmall polarization splitter based on silicon wire waveguides", Optics Express, vol. 14, Issue 25, 12401-12408 (2006).

PCT International Search Report, PCT/US2011/063875, International Filing Date Dec. 8, 2011, Mailed May 4, 2012, 3 pgs.

Abstract of Japanese Patent Publication JP2000121855 (2000) (at Espacenet) 1 page.

Taiwan Patent Office Search Report for Taiwan Patent Application No. 100147179, which is a foreign counterpart to U.S. Appl. No. 12/976,554 and U.S. Appl. No. 14/069,540, dated Dec. 17, 2013, 1 page, and English translation of said Search report.

Supplementary European Search Report, Application No. 11851836.4-1504/2656136, PCT/US2011/063875, Mailed May 13, 2014, 6 pages.

English version of Korean Patent Abstract No. 1020050088074A, Published Sep. 1, 2005, 1 pg.

English version of Patent Abstracts of Japan No. 2010-054929, Published Mar. 11, 2010, 1 pg.

English version of Patent Abstracts of Japan No. 05-323138, Published Dec. 7, 1993, 1 pg.

English version of Korean Patent Abstract No. 1020050049559A, Published May 25, 2005, 1 pg.

English version of Patent Abstracts of Japan No. 2009-098195, Published May 7, 2009 1 pg.

Espacenet Abstract of JPH10115724 (A), May 6, 1998, 1 pg.

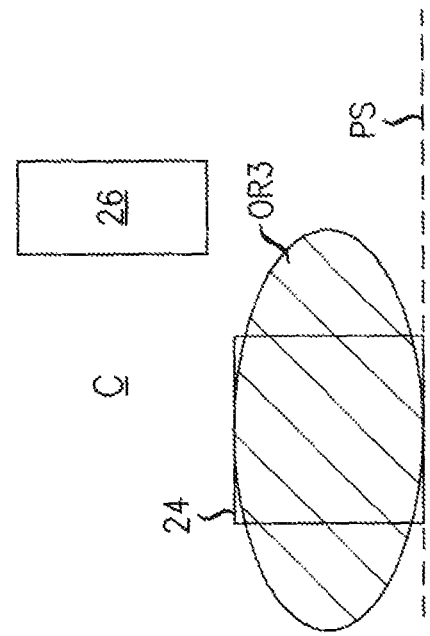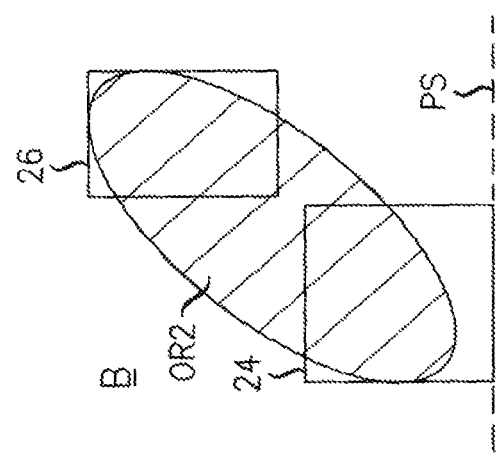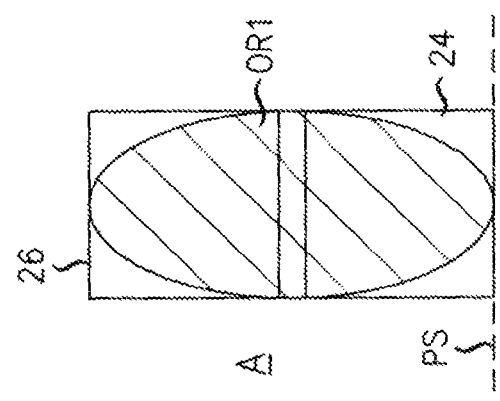

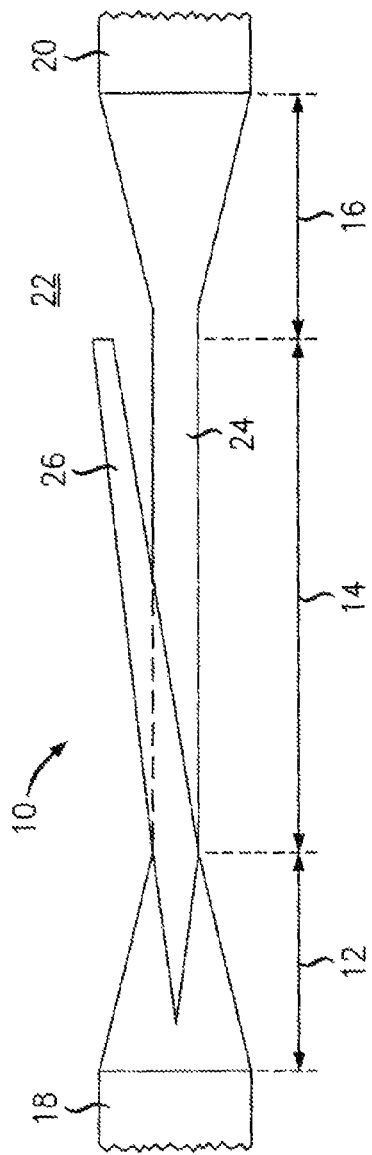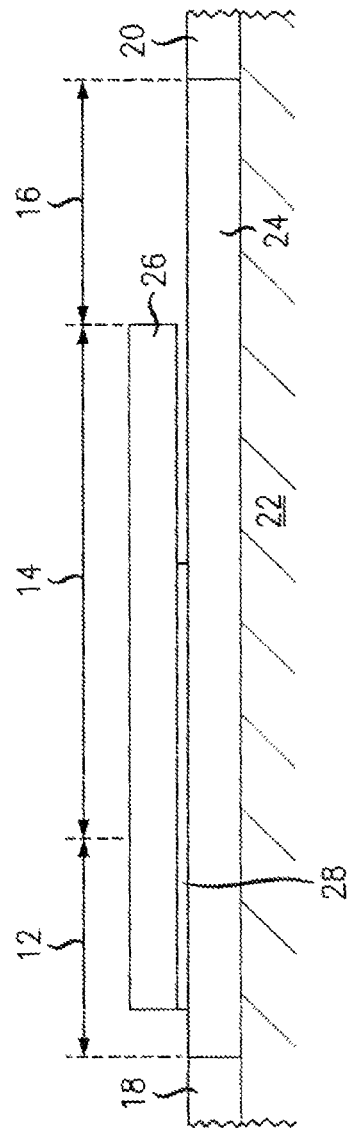
FIG. 4A
FIG. 4B

PLANAR POLARIZATION ROTATOR

This application is a continuation of U.S. application Ser. No. 14/069,540, which is a divisional of U.S. application Ser. No. 12/976,554 and is now issued as U.S. Pat. No. 8,750,651.

BACKGROUND

1. Technical Field

The invention relates to polarization rotators and methods or making and using polarization rotators.

2. Related Art

This section introduces aspects that may be helpful to facilitating a better understanding of the inventions. Accordingly, the statements of this section are to be read in this light and are not to be understood as admissions about what is in the prior art or what is not in the prior art.

Some optical components process one or both orthogonal linear polarization component(s) separately to perform function(s) associated with the optical communication of a digital data stream. To enable such processing, a polarization splitter may process received light to separate the two orthogonal linear polarization components thereof. Additionally, to enable such processing, a polarization rotator may rotate one or both of the separated linear polarization components of such light. For example, such optical rotating may align the polarizations of both of the separated polarization components.

SUMMARY

One embodiment provides an apparatus that includes an optical polarization rotator having first and second optical waveguide ribs located along a planar surface of a substrate. The second optical waveguide rib is located farther from the surface than the first optical waveguide rib. First segments of the two optical waveguide ribs form a vertical stack over the substrate. Second segments of the two optical waveguide ribs are offset laterally in a direction along the planar surface. The first and second optical waveguide ribs are formed of materials with different bulk refractive indexes.

In some embodiments, the above apparatus may further include a spacer layer between the first and second optical waveguide ribs. Such a spacer layer may be, e.g., formed of a material with a different bulk refractive index than the materials of the first and second optical waveguide ribs. Such a spacer layer may be thinner vertical to the surface than the first optical waveguide rib.

In some embodiments of any of the above apparatus, the first optical waveguide rib may be formed of a same material as a portion of the planar surface of the substrate.

In some embodiments of any of the above apparatus, one of the optical waveguide ribs may be formed of a semiconductor, and the other of the optical waveguide ribs may be formed of a dielectric.

In some embodiments of any of the above apparatus, the optical polarization rotator may be configured to rotate a polarization of received linearly polarized light by at least 45 degrees.

In some embodiments of any of the above apparatus, the apparatus may include a transition region in which the first optical waveguide rib has a width lateral to the surface that monotonically tapers from a larger value at a boundary of an input planar optical waveguide to a smaller value at the first segment of first optical waveguide rib. In some such apparatus, the second optical waveguide rib has a width lateral to the surface that monotonically tapers from a smaller value at an end thereof nearer to the input optical waveguide to a larger value at the first segment of second optical waveguide rib.

In some embodiments of any of the above apparatus, the apparatus may include a transition region in which the first optical waveguide rib has a width lateral to the surface that monotonically tapers from a smaller value at the second segment of first optical waveguide rib to a larger value at a boundary of an output planar optical waveguide.

In some embodiments of any of the above apparatus, the apparatus may include a polarization beam splitter having a first optical output connected to transmit light to the first optical waveguide rib and a second optical output connected to a first specific output optical waveguide that is located over the substrate lateral to the first optical waveguide rib. In some such embodiments, the apparatus may further include a second specific output optical waveguide connected to the first optical output of the polarization beam splitter via the optical polarization rotator. The apparatus may be configured to transmit light of substantially the same linear polarization to the two specific output optical waveguides.

In some embodiments of the above apparatus, the apparatus may include an optical modulator having a 1×2 optical splitter, first and second optical waveguide arms, and a 2×1 optical combiner. Each optical waveguide arm connects a corresponding optical output of the 1×2 optical splitter to a corresponding optical input of the 2×1 optical combiner and includes an electro-optical modulator capable of modulating the phase and/or amplitude of light propagating there through responsive to electrical signals received therein. In such embodiments, the optical polarization rotator is located in one of the optical waveguide arms.

Another embodiment provides a method. The method includes forming an optical layer over a first optical waveguide rib located along a planar surface of a substrate. The optical layer and first optical waveguide rib are formed of materials with different bulk refractive indexes. The method also includes etching the optical layer to form a second optical waveguide rib. First segments of the optical waveguide ribs form a stack vertically oriented with respect to the planar surface. Second segments of the optical waveguide ribs are relatively laterally offset along the planar surface.

In some embodiments, the above method may further include forming a spacer layer over the first optical waveguide rib prior to forming the optical layer. The spacer layer is formed of a material with a different bulk refractive index than the materials of the optical layer and the first optical waveguide layer.

In some embodiments of any of the above methods, the first optical waveguide and a portion of the planar surface may be formed of the same optical material. In some such embodiments, the etching may be performed such that the optical material functions as a stopping layer during the etching.

In some embodiments of any of the above methods, one of the optical layer and the first optical waveguide rib may be formed of a semiconductor, and the other of the optical layer and the first optical waveguide rib may be formed of a dielectric.

In some embodiments of any of the above methods, third and fourth segments of the first optical waveguide rib may be located lateral to the second optical waveguide rib and may be laterally wider than the first and second segments of the first optical waveguide rib. In such embodiments, the first and second segments of the first optical waveguide rib are connected between the third and fourth segments thereof.

Another embodiment provides a second method that includes receiving, at a first end of a segment of a hybrid optical waveguide, linearly polarized light from a planar waveguide; and propagating the light through the segment of the hybrid optical waveguide to rotate a linear polarization of the light. The segment of the hybrid optical waveguide includes one segment in which a second optical waveguide rib is vertically located over a first optical waveguide rib and includes another segment in which the second optical waveguide rib is substantially laterally offset from a corresponding segment of the first optical waveguide rib. The first and second optical waveguide ribs are formed of materials having different bulk refractive indexes.

In some embodiments of the second method, one of the first and second optical waveguide ribs may be a semiconductor rib and the other of the first and second optical waveguide ribs may be a dielectric rib.

In any of the above embodiments of the second method, the segment of the hybrid optical waveguide may include a spacer layer being located between the first and second optical waveguide ribs and being made of a material with a different bulk refractive index than the materials of the optical waveguide ribs.

BRIEF DESCRIPTION OF THE DRAWINGS

FIGS. 2A, 2B, and 2C are cross-sectional views schematically illustrating the evolution of the light power distribution of a first optical propagating mode in the optical polarization rotator of FIGS. 1A-1B at lateral planes A, B, and C, respectively, of FIGS. 1A-1B;

FIGS. 4A, 4B, and 4C are respective top, side, and oblique views schematically illustrating a specific embodiment of the optical polarization rotator of FIGS. 1A-1B;

DETAILED DESCRIPTION OF ILLUSTRATIVE EMBODIMENTS

Herein, an optical waveguide refers to an optical structure that causes received light to propagate along a predefined optical guiding direction. An optical waveguide is different from an optical structure that simply confines received light to propagate in a plane. Herein, an optical waveguide may refer to an unclad optical waveguide or the optical core of a clad optical waveguide. That is, the expression optical waveguide covers both types of structures.

Figure 1A:
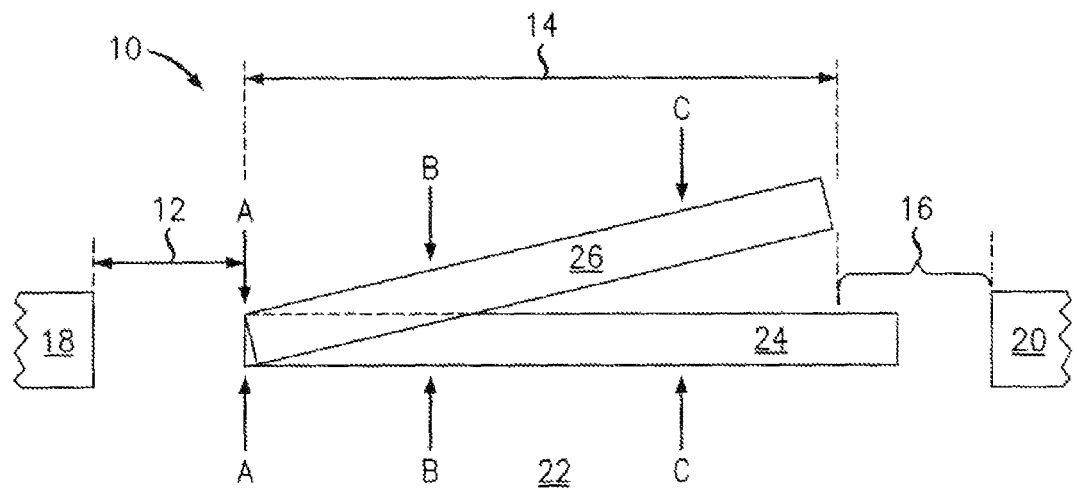
FIGS. 1A and 1B are respective top and side views that illustrate an optical polarization rotator.
Figure 1B:
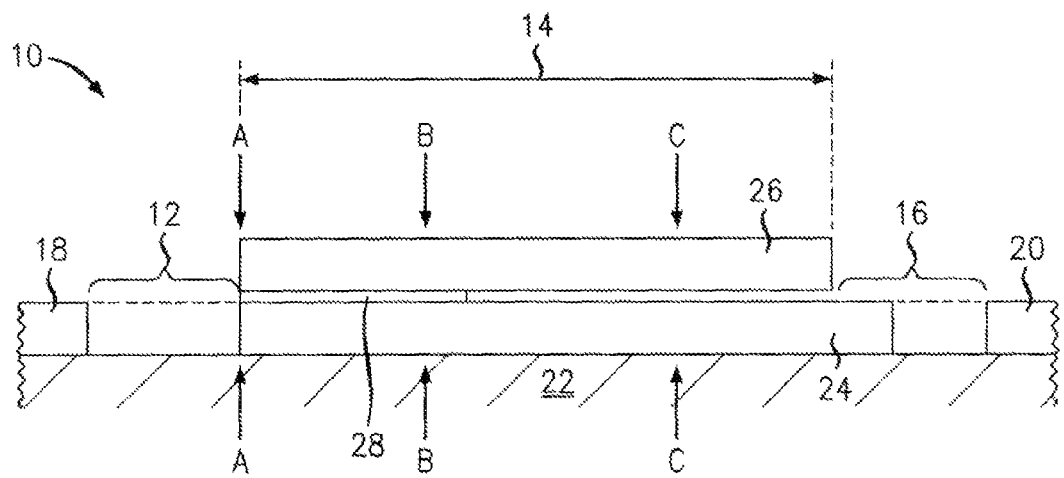

FIGS. 1A and 1B illustrate an optical polarization rotator 10 formed as an optical waveguide. The optical waveguide has a first transition region 12, a polarization rotation region 14, and a second transition region 16. The first transition region 12 optically end-connects the polarization rotation region 14 to an input optical waveguide 18, e.g., a planar optical waveguide. The polarization rotation region 14 rotates a linear polarization of light received in one or two substantially linearly polarization propagating modes. The second transition region 16 optically end connects the polarization rotation region 14 to an output optical waveguide 20, e.g., a planar optical waveguide.

The first and second transition regions 12, 16 are optical coupling regions with the respective input and output optical waveguides 18, 20. In some embodiments, the transition regions 12, 16 also redistribute light power density of propagating optical modes vertically or laterally with respect to the nearby surface of the substrate 22, e.g., without rotating linear polarizations. The first transition region 12 may include tapering of the optical waveguide that adiabatically may redistribute said light power densities over larger vertical region. The second transition region 16 may include tapering of the optical waveguide that adiabatically redistributes said received light power densities over smaller vertical region.

The polarization rotation region 14 includes an optical stack and a substrate 22. The optical stack includes a first optical waveguide rib 24 located on the substrate 22 and a second optical waveguide rib 26 located farther from a planar surface of the substrate 22 than the first optical waveguide rib 24. The first and second optical waveguide ribs 24, 26 are formed of materials having different bulk refractive indexes. For example, one of the optical waveguide ribs 24, 26 may be made of a semiconductor, and the other of the optical waveguide ribs 26, 24 may be made of a dielectric. Alternatively, the first and second optical waveguide ribs 24, 26 may be made of different dielectrics or different semiconductors.

In some embodiments, the first optical waveguide rib 24 may be an integral part of the substrate 22. Then, the first optical waveguide rib 24 is formed of the same material as portions of the nearest planar surface of the substrate 22.

Alternatively, the first optical waveguide rib 24 may be formed of a different material, e.g., of a material of different refractive index, than nearby portions the planar surface of the substrate 22.

Indeed, the first optical waveguide rib 24 may be located on and in direct contact with the nearby planar surface of the substrate 22 or may be located over the nearby planar surface of the substrate 22 without being in direct contact with said planar surface.

The second optical waveguide rib 26 may be on and in direct contact with the first optical waveguide rib 24 (not shown) or may be located over the first optical waveguide rib 24 and separated from the first optical waveguide rib 24 by a spacer layer 28 of substantially optically transparent material. Such a spacer layer 28 is typically vertically thinner than the first optical waveguide rib 24.

In the polarization rotation region 14, the central axes of the first and second optical waveguide ribs 24, 26 are oriented along diverging lateral directions. For that reason, the vertical overlap between lateral widths corresponding segments of the first and second optical waveguide ribs 24, 26 decreases along the direction of light propagation in the polarization rotation region 14, i.e., decreases to the right in FIGS. 1A-1B. Thus, some corresponding segments of the first and second optical waveguide ribs 24, 26 may be laterally offset along the planar surface of the substrate 22, i.e., in right most portions of the polarization rotation region 14.

In the polarization rotation region 14, each of optical waveguide ribs 24, 26 may have a constant lateral width or may have a non-constant width. For example, the width of the first optical waveguide rib 24 may increase along the direction of light propagation in the polarization rotation region 14. Also, the width of the second optical waveguide rib 26 may decrease along the direction of light propagation in the polarization rotation region 14.

The vertical widths of the first and second optical waveguide ribs 24, 26 are typically substantially constant over the optical polarization rotator 10.

FIGS. 2A, 2B, and 2C schematically illustrate expected light power distributions of a first propagating light mode at successive lateral planes A, B, and C in the FIGS. 1A-1B. The first propagating mode is initially a transverse magnetic (TM) propagating light mode, which has an initial linear polarization.

At the initial lateral plane A, the lateral cross sections of the first and second optical waveguide ribs 24, 26 are aligned vertically with respect to the planar surface PS of the substrate 22. At the initial lateral plane A, the optical power of the first propagating light mode, i.e. a TM mode, is concentrated in a first oblong region OR1 whose major axis is vertically oriented with respect to the planar surface PS of the substrate 22.

At the later lateral plane B, centers of the cross sections of the first and second optical waveguide ribs 24, 26 are substantially laterally offset, and the optical power of the first propagating light mode is concentrated in a second oblong region OR2. The oblong region OR2 is strongly tilted with respect to the normal direction to the planar surface PS of the substrate 22 so that the oblong region's major axis is approximately oriented along a diagonal between centers of the two optical waveguide ribs 24, 26.

At the final lateral plane C, the cross sections of the first and second optical waveguide ribs 24, 26 are separated by a large lateral gap, and the optical power of the first propagating light mode is concentrated in a third oblong region OR3 whose major axis is approximately parallel to the planar surface of the substrate 22.

Thus, the slow evolution of the optical stack gradually rotates the oblong region in which the optical power of the first light propagating mode is concentrated. During the gradual rotation, the linear polarization of the first propagating light mode rotates with the oblong region in which the optical power of the mode is concentrated. In the illustrated example, the polarization rotation is by about π/2 radians thereby changing the initial TM propagating light mode into a final transverse electric (TE) propagating light mode.

Figure 3A:
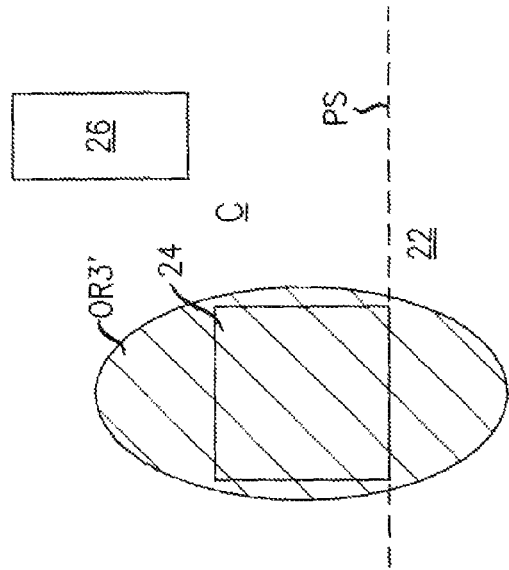
FIGS. 3A, 3B, and 3C are cross-sectional views schematically illustrating the evolution of the light power distribution of a second, relatively orthogonal, optical propagating mode in the optical polarization rotator of FIGS. 1A-1B at the same respective, lateral planes A, B, and C of FIGS. 1A-1B.
Figure 3B:
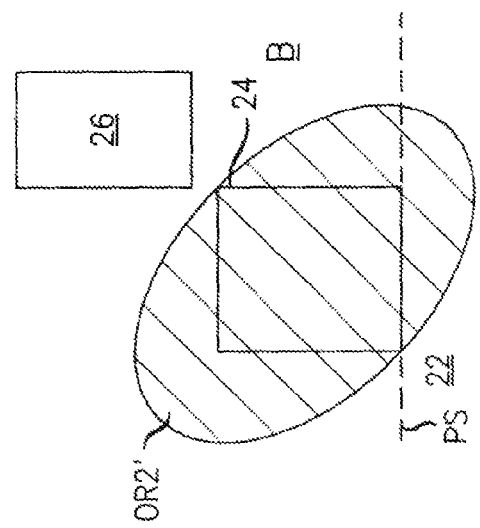
Figure 3C:
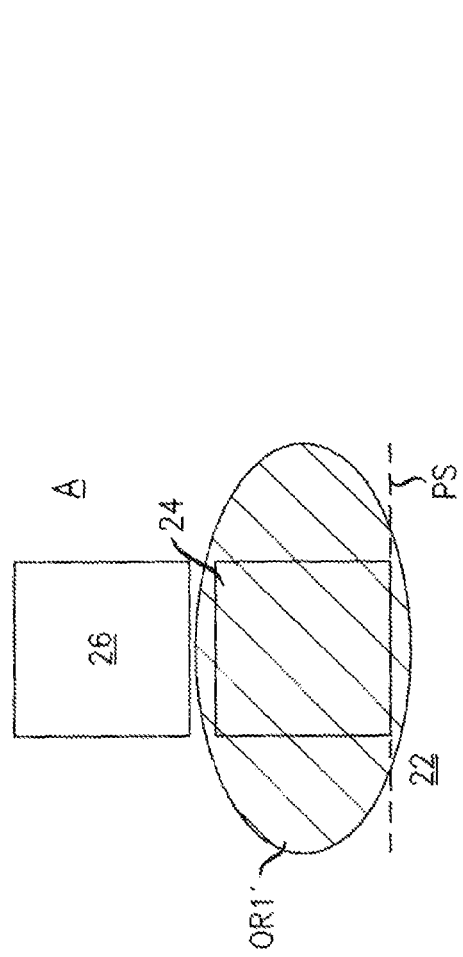

FIGS. 3A, 3B, and 3C schematically illustrate expected light power distributions of a second propagating light mode at the same respective lateral planes A, B, and C in the FIGS. 1A-1B. The first propagating mode is initially a TE propagating light mode, which has an initial linear polarization and is relatively orthogonal to the first propagating light mode.

At the initial lateral plane A, the cross sections of the first and second optical waveguide ribs 24, 26 are vertically aligned, and the optical power of the second propagating light mode, i.e. a TE mode, is concentrated in a different first oblong region OR1'. The first oblong region OR1' has a major axis that is horizontally oriented parallel to the planar surface of the substrate 22.

At the later lateral plane B, the centers of the cross sections of the first and second optical waveguide ribs 24, 26 are substantially laterally offset, and the optical power of the second propagating light mode is concentrated in a different second oblong region OR2'. The oblong region OR2' is strongly tilted with respect to the normal direction to the planar surface of the substrate 22 so that the oblong region's major axis is approximately oriented along a diagonal between centers of the two optical waveguide ribs 24, 26.

At the final lateral plane C, the cross sections of the first and second optical waveguide ribs 24, 26 are separated by a large lateral gap, and the optical power of the second propagating light mode is concentrated in a different third oblong region OR3' whose major axis is approximately oriented perpendicular to the planar surface of the substrate 22.

Thus, the slow evolution of the optical stack also gradually rotates the oblong region in which the optical power of the second propagating light mode is concentrated. During the gradual rotation, the linear polarization of the second propagating light mode rotates with the major axis of the oblong region in which the optical power of the mode is concentrated. In the illustrated example, the rotation is by about π/2 radians thereby changing the initial TE propagating light mode into a final TM propagating light mode.

Figure 4C:
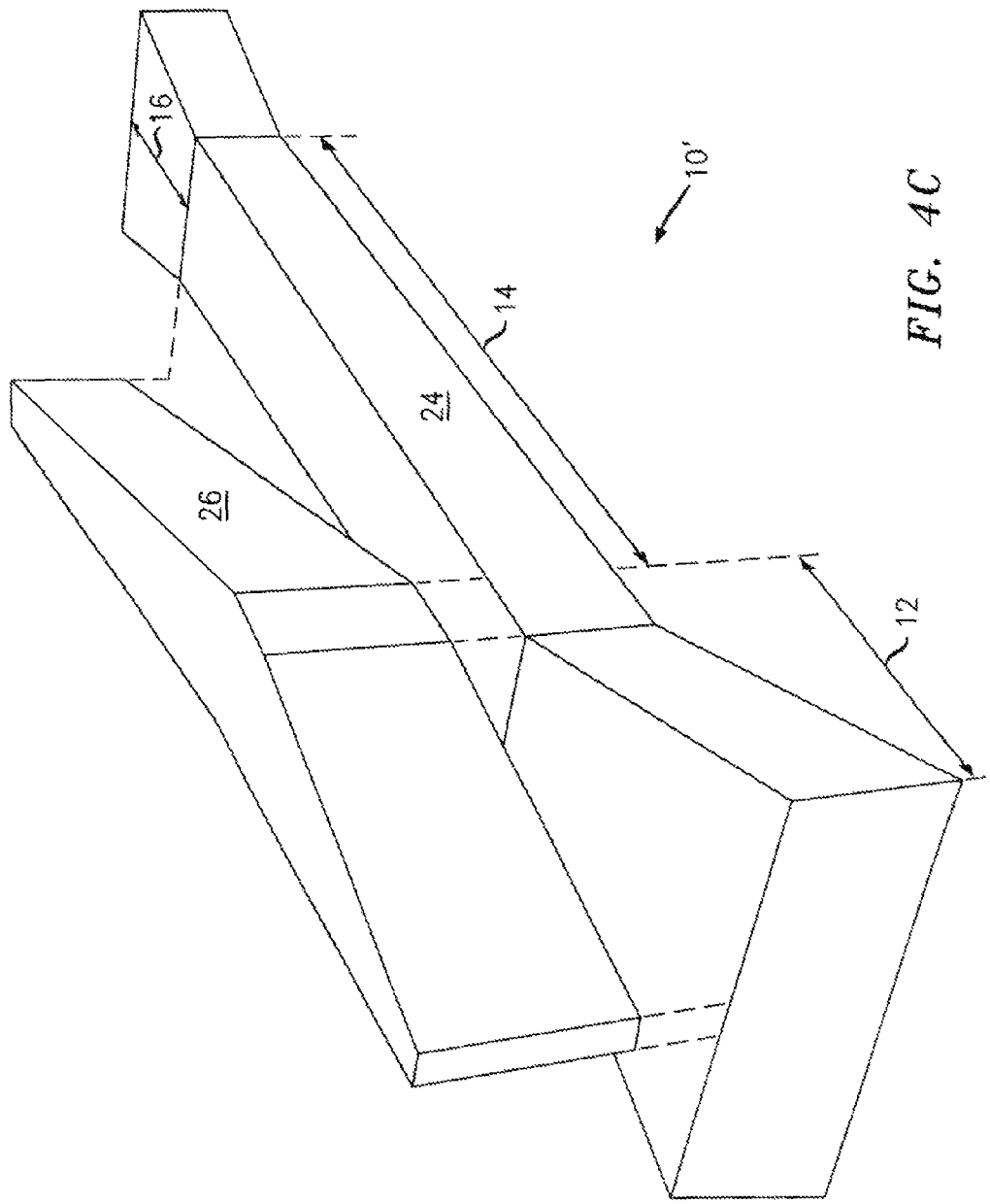

FIGS. 4A, 4B, and 4C illustrate a specific example 10' of the optical waveguide 10 illustrated in FIGS. 1A-1B. The optical waveguide 10' has the first transition region 12, the polarization rotation region 14, and the second transition region 16. In the polarization rotation region 14 and a segment of the first transition region 12, the optical waveguide 10' includes the first and second optical waveguide ribs 24, 26. The first optical waveguide rib 24 is again located closer to the planar surface of the substrate 22 than the second optical waveguide rib 26.

In the first transition region 12, the cross section of the optical waveguide 10' gradually varies so that the lateral light power distributions of propagating light modes evolve to become as schematically illustrated in FIG. 2A or 3A. In this example, the variations involve lateral variations of both optical waveguide ribs 24, 26. The variations include a smooth tapering that monotonically decreases the lateral width of the first optical waveguide rib 24 along the propagation direction. The inventor believes that the gradual decrease of this lateral width causes more optical power of initial TE and TM propagating light modes to be re-distributed to the exterior of the first optical waveguide rib 24. The variations also include a smooth tapering that monotonically increases the lateral width of the second optical waveguide rib 26 along the propagation direction. The inventor also believes that the gradual increase of this lateral width causes more optical power of the initial TM propagating light mode to be re-distributed from the first optical waveguide rib 24 to the second optical waveguide rib 26. Without the tapered segments of the first and second optical waveguide ribs 24, 26, the inventor believes that light injected from the input optical waveguide would probably produce more scattering, reflection and excitation of higher modes, i.e., causing higher insertion losses in the optical polarization rotator 10'.

In the polarization rotation region 14, the optical waveguide 10' undergoes smooth variations so that the propagating modes of substantially linear polarization evolve so that their linear polarizations are rotated, e.g., as schematically illustrated in FIGS. 2A-2C and 3A-3C. Here, the variations involve a smooth decrease, along the propagation direction, in the lateral overlap between the cross sections of the first and second optical waveguide ribs 24, 26. This decrease is due, at least in part, to an angular mis-alignment between the axes of the first and second optical waveguide ribs 24, 26. In some embodiments, the decrease may also be due, in part, to an optional monotonic and smooth decrease in the lateral width of the second optical waveguide rib 26 along the propagation direction. Here, the variations may also involve a smooth and monotonic increase in the lateral width of the first optical waveguide rib 24 along the propagation direction.

In the second transition region 16, the cross section of the optical waveguide 10' gradually varies so that the lateral light power distributions of the final propagating light modes will couple more efficiently to the propagating light modes of the output optical waveguide 20. Here, the variation is a smooth tapering that monotonically increases the lateral width of the first optical waveguide rib 24 along the propagation direction. The second optical waveguide rib 26 is either absent in the second transition region 16 or is offset by a large lateral distance from the first optical waveguide rib 24, e.g., so as to not significantly influence the evolution of propagating light modes in the second transition region 16.

The above description describes the propagation direction of light as being from the left to right during operation of the optical polarization rotators 10, 10' that are schematically illustrated in FIGS. 1A-1B and 4A-4C. Nevertheless, the optical polarization rotators 10, 10' also function when light propagates in the opposite direction therein. That is, the optical polarization rotators 10, 10' will also rotate the linear polarization of light injected thereto from the optical waveguide 20, which is shown at the right in FIGS. 1A-1B and 4A-4C.

ILLUSTRATIVE EXAMPLE

FIGS. 4A-4C illustrate an example of the optical waveguide 10' that can be, e.g., fabricated from commercially available silicon-on-insulator (SOI) substrates and, e.g., using complementary metal-oxide-semiconductor processes.

In the example, the first and second optical waveguide ribs 24, 26 and the input and output optical waveguides 18, 20 are constructed as described here. The first optical waveguide rib 24 is formed of a portion of the silicon layer of the initial SOI substrate and has a thickness of about 200 nanometers (nm). The second optical waveguide rib 26 is formed of silicon nitride and has a thickness of about 400 nm. The input and output optical waveguides 18, 20 are formed of portions of the silicon layer of the initial SOI substrate and have thicknesses of about 200 nm and lateral widths of about 500 nm to 600 nm.

In the example, the optical waveguide 10' includes the optional spacer layer 28, which is about 100 nm of silicon dioxide located between the first and second optical waveguide ribs 24, 26.

In the example, the first transition region 12, the polarization rotation region 14, and second transition region 16 have lateral sizes and shapes as described below.

In the first transition region 12, the first and second optical waveguide ribs 24, 26 have laterally aligned central axes and extend over the full length of the region 12, which may be, e.g., about 50 micro-meters (μm) long. The first optical waveguide rib 24 has an initial lateral width of about 500 nm to 600 nm, at the boundary with the input optical waveguide 18. Its initial lateral width, which about matches that of the input optical waveguide 18, linearly decreases with distance to a value of about 200 nm at or near the boundary of the polarization rotation region 16. The second optical waveguide rib 26 has an initial lateral width of about 100 nm or less, at or near the boundary with the input optical waveguide 18, and its lateral width linearly increases with distance to a value of about 200 nm at or near the boundary of the polarization rotation region 16.

In some embodiments, the lateral widths of one or both of the first and second optical waveguide ribs 24, 26, in the first transition region 12, reach a value of about 200 nm shortly before the boundary of the polarization rotation region 14. For example, these lateral widths may reach the 200 nm value at a distance of the order of 100 nm or more from the boundary and then, remain constant up to the boundary of the polarization rotation region 14.

In the polarization rotation region 14, the first and second optical waveguide ribs 24, 26 extend about the full length of the region 14, which may be, e.g., between 250 μm to about 300 μm long. The first optical waveguide rib 24 has an initial lateral width of about 200 nm, at the boundary with the first transition region 12, and its lateral width increases linearly to about 260 nm, at the boundary with the second lateral region 16. The second optical waveguide rib 26 has a lateral width of about 200 nm, at the boundary with the first transition region 12, and its lateral width may be constant or may decrease linearly to a value about 150 nm or less, at the boundary with the second transition region 14. Due to a divergent lateral alignment between central axes of the first and second optical waveguide ribs 24, 26 in the polarization rotation region 14, the second optical waveguide rib 26 has a lateral offset of about 150 nm to about 200 nm from the corresponding portion of the first optical waveguide rib 24, at and near the boundary with the second transition region 16.

In the second transition region 16, the first optical waveguide rib 24 extends over the full length of the region 16, which may be, e.g., about 50 μm. The first optical waveguide rib 24 has an initial lateral width of about 260 nm, at the boundary with the polarization rotation region 14, and its lateral width linearly increases with distance to a value of about 500 nm to 600 nm at the boundary with the output optical waveguide 20.

The second optical waveguide rib 26 may or may not project into an initial part of the second transition region 16. In cases where the second optical waveguide rib 26 projects into the second transition region 16, the lateral width of the second optical waveguide rib 26 may continue to smoothly decrease from about 150 nm to about 100 nm or less. In the second transition region 16, the gradual outward taper of the first optical waveguide rib 24 is insufficient to substantially decrease the lateral offset between the first and second optical waveguide ribs 24, 26 therein. Due to the large initial lateral offset, the second optical waveguide rib 26 does not cause substantial polarization rotation of light while propagating in the second transition region 16.

In various embodiments of the polarization rotators 10, 10' of FIGS. 1A-1B and 4A-4C, differences between the material compositions of the first optical waveguide ribs 24, 24 and the material compositions of the second optical waveguide rib 26, 26 may be advantageous during fabrication. In particular, the different material compositions may enable use of the material of the first optical waveguide rib 24 and/or the optional spacer layer 28 between the first optical waveguide rib 24 and the second optical waveguide rib 26 as etch stops for anisotropic etches of the second optical waveguide rib 26 and/or the optional spacer layer 28. Such different compositions can support simpler and/or more accurate etching fabrications of the optical waveguide ribs 24, 26 and the spacer layer 28 if present.

Figure 5:
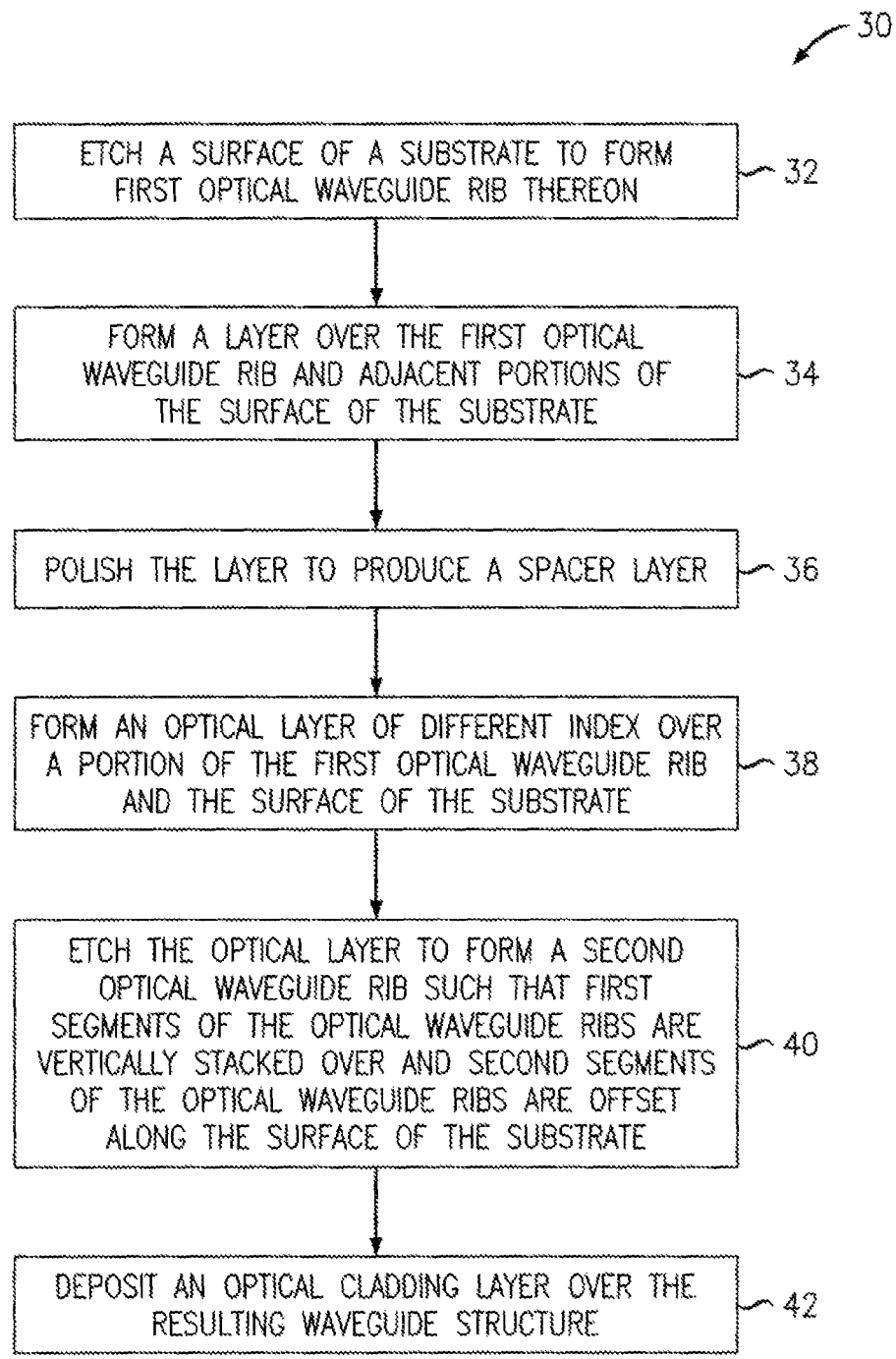
FIG. 5 is a flow chart schematically illustrating a method of fabricating an optical polarization rotator, e.g., the optical polarization rotator schematically illustrated in FIGS. 4A-4C.

FIG. 5 schematically illustrates an example method 30 for fabricating an optical polarization rotator, e.g., the optical polarization rotator 10, 10' of FIGS. 1A-1B and/or 4A-4C.

The method 30 includes performing an etch of the top layer of the substrate, e.g., the silicon layer of the SOI substrate, to form the first optical waveguide rib 24 of FIGS. 4A-4C (step 32). The same etch may be used to form additional silicon optical waveguides lateral to the first optical waveguide rib 24, e.g., to form the input and output optical waveguides 18, 20 of FIGS. 1A-1B and 4A-4C. The etch may use any conventional process for mask-controlled etching silicon on such an example SOI substrate, e.g., an anisotropic dry etch of silicon stopping on silicon dioxide.

The method 30 may optionally include forming a layer of different material over the first optical waveguide rib 24 and, e.g., also over laterally adjacent portions of the planar surface of the substrate 22 and/or laterally adjacent optical waveguides (step 34). The layer of different material may be formed, e.g., by a conventional deposition process that forms silicon dioxide layers of optical quality.

If step 34 is performed, the method 30 may include chemical-mechanical polishing the layer of different material formed at step 34, to produce a suitable spacer layer, e.g., the spacer layer 28 of FIGS. 1A-1B and 4A-4C (step 36). The chemical-mechanical polishing, e.g., may produce a flat spacer layer of silicon dioxide, e.g., with a thickness of about 100 nm or less on the first optical waveguide rib that was formed at the step 32. The chemical-mechanical polishing may use any conventional processes known by persons of ordinary skill in the art to be effective for polishing the layer of different material, which was formed at step 34.

The method 30 also includes forming an optical layer over a portion of the first optical waveguide rib 24 and, e.g., over a portion of the planar surface of the substrate 22 (step 38). The forming step 38 may involve, e.g., depositing a layer of about 400 nm of silicon nitride on the optional spacer layer and may use any conventional process, known to persons of ordinary skill, for depositing optical layers of silicon nitride. The optical layer, the first optical waveguide rib 24, and the spacer layer are typically formed of materials with different bulk refractive indexes.

The method 30 also includes etching the optical layer to form the second optical waveguide rib 26, e.g., directly on the optional spacer layer 28 or directly on the first optical waveguide rib 24 (step 40). The second optical waveguide rib 26 is formed such that first segments of the first and second optical waveguide ribs 24, 26 form a stack vertically oriented with respect to the planar surface of the substrate 22 and such that second segments of the optical waveguide ribs 24, 26 are relatively laterally offset in a direction along the planar surface of the substrate 22. In embodiments where the optical layer is silicon nitride, the etch step 40 may use, e.g., any conventional process for etching silicon nitride. For example, the etch step may include an anisotropic dry etch for silicon nitride that substantially stops on the silicon dioxide of the example spacer layer 28 and/or substantially stops on silicon of the example silicon first optical waveguide rib 24 and/or the silicon surface of the example substrate 22.

The method may also include depositing a cladding layer, e.g., a silicon dioxide layer, over the waveguide structure produced at above step 40 (step 42). For example, the cladding layer may have a thickness of a few micro-meters or more. The depositing step 42 may, e.g., use any conventional process for depositing a thick optical cladding layer of silicon dioxide.

Figure 6:
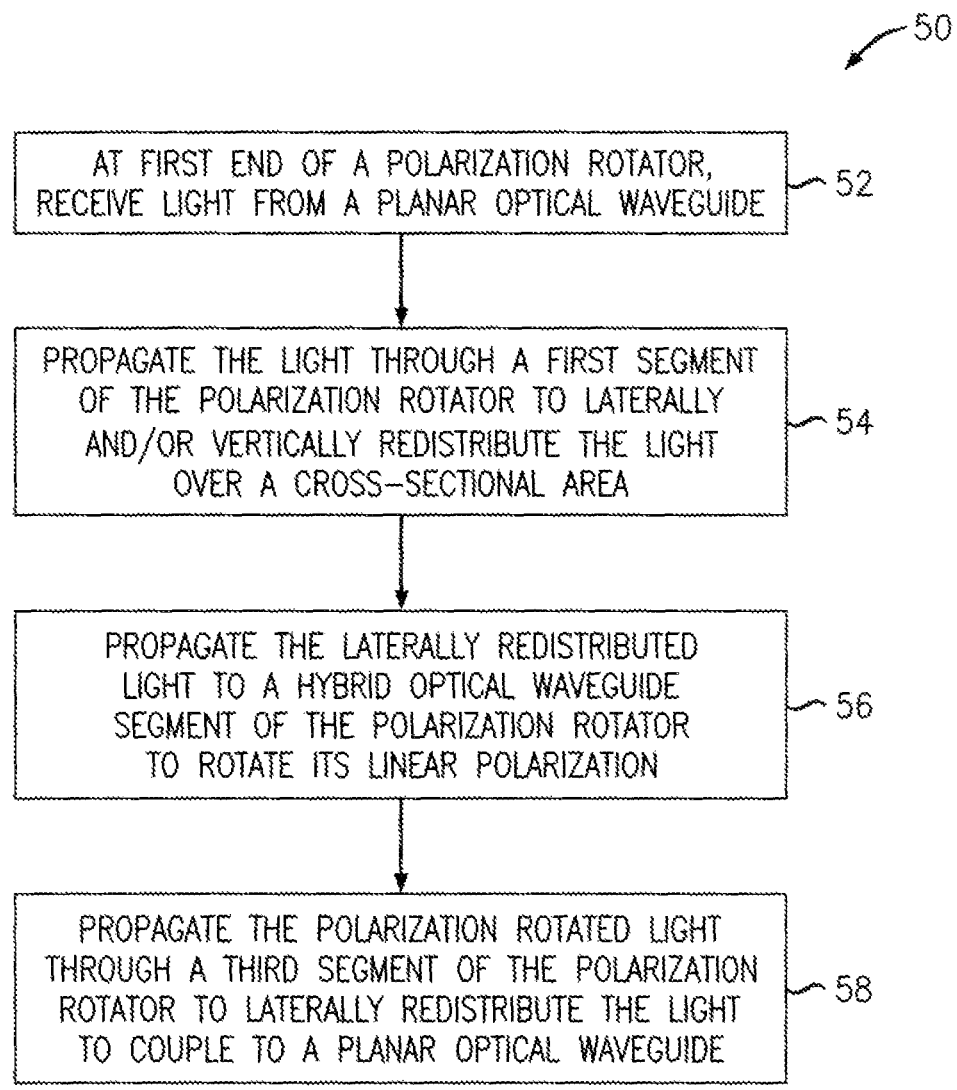
FIG. 6 is a flow chart schematically illustrating a method to rotate polarizations of linear polarized light, e.g., in the optical polarization rotators schematically illustrated in FIGS. 1A-1B and 4A-4C.

FIG. 6 schematically illustrates a method 50 for rotating the polarization of a linear polarization component in a planar optical polarization rotator, e.g., the optical polarization rotators 10, 10' illustrated in FIGS. 1A-1B and 4A-4C.

The method 50 includes receiving, at a first end of the polarization rotator, light from a planar waveguide, e.g., from the input optical waveguide 18 (step 52). The received light typically is in a linear polarized mode, e.g., a TE or TM propagating light mode or an about in-phase combination of TE and TM propagating light modes.

The method 50 optionally includes propagating the received light through a first tapered waveguide segment of the optical polarization rotator such that a substantial portion of the light power thereof is laterally and/or vertically redistributed, e.g., in the first transition region 12 of FIGS. 1A-1B and 4A-4C (step 54). The lateral and/or vertical redistribution of the light power is typically performed without substantial changes to the polarization of the received light.

The method 50 includes propagating the laterally redistributed light power along a hybrid optical waveguide segment of the polarization rotator to rotate a linear polarization of the light by a substantial angle, e.g., an angle of greater than 45 degrees and often an angle of about 90 degrees, e.g., in the polarization rotation region 16 of FIGS. 1A-1B and 4A-4C (step 56). The hybrid optical waveguide segment includes one segment in which a second optical waveguide rib is vertically located over a first optical waveguide rib, e.g., as in the left portion of the polarization rotation region 14 of FIGS. 1A-1B and 4A-4C, respectively. The hybrid optical waveguide segment includes another segment in which the second optical waveguide rib is substantially laterally offset from the corresponding segment of the first optical waveguide rib, because the two optical waveguide ribs are directed along divergent directions in the hybrid optical waveguide segment of the polarization rotator. In the hybrid optical waveguide segment, the first and second optical waveguide ribs are formed of materials having different bulk refractive indexes.

The method 50 may include propagating light from the hybrid optical waveguide segment through a final tapered waveguide segment of the optical polarization rotator such that a substantial portion of the light power is laterally and/or vertically redistributed, e.g., in the second transition region 16 of FIGS. 1A-1B and 4A-4C (step 58). This final lateral re-distribution of the light power may be performed without substantially changing the polarization of the light being transmitted. This lateral re-distribution produces a more efficient coupling of the polarization rotated light to propagating light mode(s) of an output planar waveguide, e.g., output optical waveguide 20 of FIGS. 1A-1B and 4A-4C.

Figure 7:
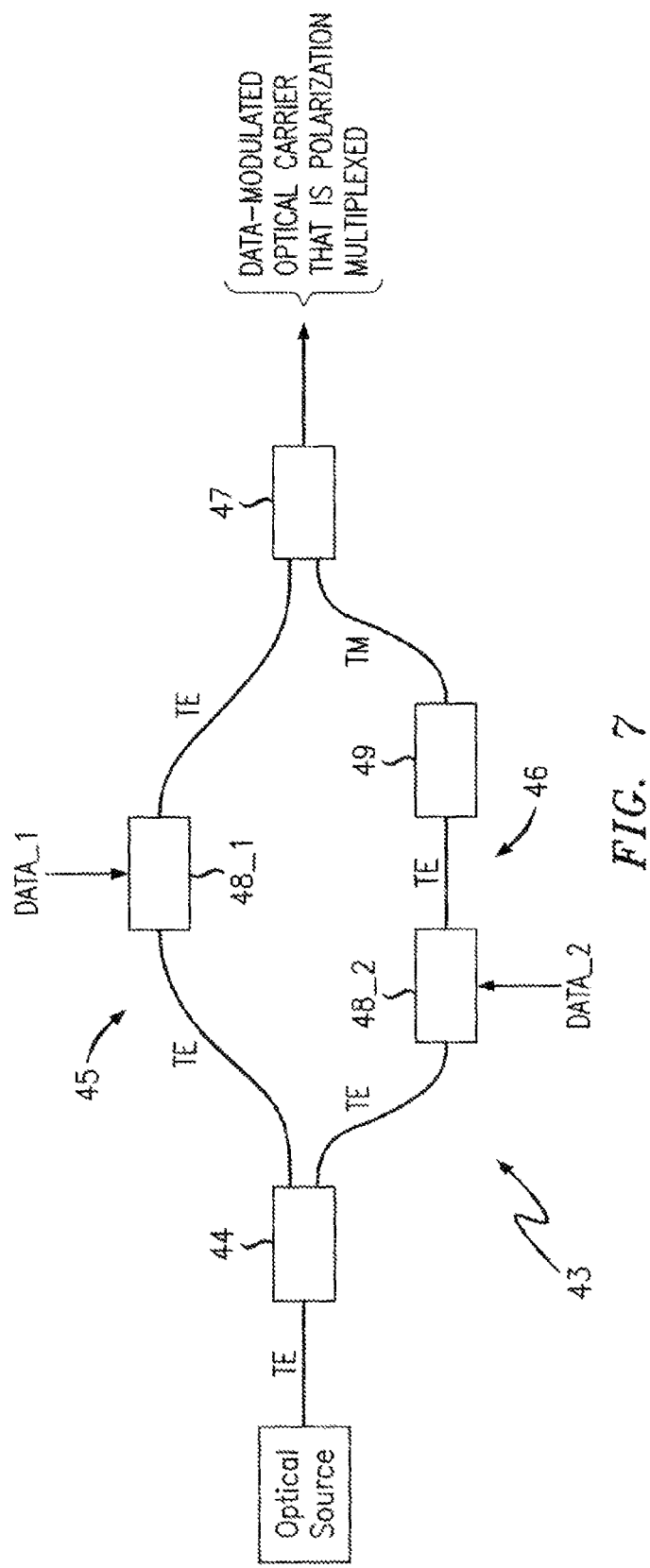
FIG. 7 is block diagram schematically illustrating an optical modulator that incorporates an optical polarization rotator, e.g., one of the optical polarization rotators of FIGS. 1A-1B or 4A-4C, to produce a polarization multiplexed, data-modulated optical carrier.

FIG. 7 illustrates an optical modulator 43 that supports polarization mode multiplexing of digital data. The optical modulator 43 includes a 1×2 optical splitter 44, first and second optical waveguide arms 45, 46, and a 2×1 optical combiner 47.

The 1×2 optical splitter 43 receives substantially linearly polarized light from an optical source, e.g., TE or TM mode laser light, and separates part of the received light into two light beams directed to the two optical waveguide arms 45, 46. In FIG. 7, the optical source is illustrated as transmitting light of an example TE mode to the 1×2 optical splitter 44.

Each optical waveguide arm 45, 46 connects a corresponding optical output of the 1×2 optical splitter 43 to a corresponding optical input of the 2×1 optical combiner 47. The 1×2 optical splitter 43 transmits light of about the same linear polarization, i.e., illustrated as example TE propagating light mode, to the two optical waveguide arms 45, 46. Each optical waveguide arm 45, 46 includes an electro-optical modulator 48_1, 48_2, which is electrically connected to receive a stream of electrical digital data signals, i.e., DATA_1 or DATA_2. Each electro-optical modulator 48_1, 48_2 modulates the phase and/or amplitude of light propagating there through to carry the received steam of received digital data signals, i.e., DATA_1 or DATA_2. The second optical waveguide arm 46 also includes an optical polarization rotator 49, e.g., the optical polarization rotator 10, 10' of FIGS. 1A-1B or 4A-4C, which rotates the linear polarization of light therein. The polarization rotator 49 rotates the linear polarization by, e.g., at least, 45 degrees, and more preferably by about 90 degrees so that modulated light beams from the two optical waveguide arms 45, 46 will have approximately orthogonal polarizations when recombined in the 2×1 optical combiner 47. The modulated light beams from the two optical waveguide arms 45, 46 are combined in the 2×1 optical combiner 47 to polarization-multiplex the two data-modulated optical carriers.

In some other embodiments, the order of the optical polarization rotator 49 and the electro-optical modulator 48_2 may be inverted on the optical waveguide arm 46.

The optical modulator 43 may be fabricated as a fully optically integrated device or as a partially optically integrated device.

Figure 8:
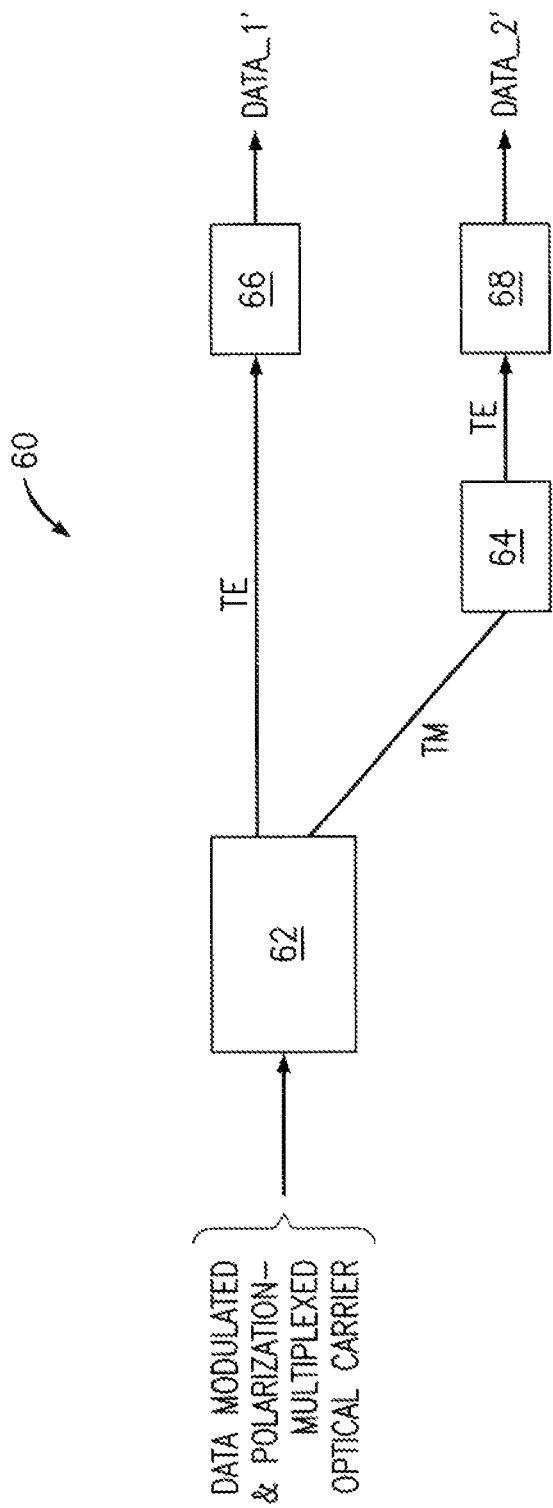
FIG. 8 is block diagram schematically illustrating an optical receiver that is configured to demodulate data separately from two linear polarization components of an data-modulated optical carrier that is polarization multiplexed, e.g., the optical carrier produced by the optical modulator schematically illustrated in FIG. 7.

FIG. 8 illustrates a portion of an optical receiver 60, which is configured to demodulate data from an optical carrier, wherein the optical carrier is polarization multiplexed with data streams DATA_1 and DATA_2. The optical receiver 60 includes a first optical polarization beam splitter 62, an optical polarization rotator 64, and first and second optical demodulators 66, 68. The optical polarization rotator 64 is connected to receive the optical signal from one optical output of the optical polarization beam splitter 62 and to optically rotate the linear polarization of said received optical signal. Due to the action of the optical polarization rotator 64, both optical demodulators receive light in a substantially similar or the same linear polarization, e.g., illustrated as an example TE propagating light mode in FIG. 8. Thus, while each optical demodulator 66, 68 demodulates a digital data, e.g., data streams DATA_1' and DATA_2', from a different linear polarization component of the light received at the input of the optical receiver 60, the two optical demodulators 66, 68 process light beams of substantially similar or the same linear polarization.

In some embodiments, the optical output of the optical polarization rotator 64 may connect directly to an optional second optical polarization beam splitter (not shown) and one of the optical outputs of the second optical polarization beam splitter then connects directly to one optical input of the second optical demodulator 68. In such embodiments, the second optical polarization beam splitter functions as a cleanup polarization filter for the optical polarization rotator 64.

In the optical receiver 60, the intermediate conversion of the linear polarization of one light beam may be useful to ensure that the processing of each data carrying optical carrier is substantially similar. That is, the intermediate conversion can be used to avoid issues related to polarization dependencies of the optical characteristics of media and waveguides of the optical demodulators 66, 68.

The Detailed Description of the Illustrative Embodiments and drawings merely illustrate the principles of the invention. It will thus be appreciated that those skilled in the art will be able to devise various arrangements that, although not explicitly described or shown herein, embody the principles of the inventions and are included within the claimed inventions. Furthermore, all examples recited herein are principally intended to be only for pedagogical purposes to aid in understanding the principles of the inventions and concepts contributed by the inventor to furthering the art, and are to be construed as being without limitation to such specifically recited examples and conditions. Moreover, all statements herein reciting principles, aspects, and embodiments of the inventions, as well as specific examples thereof, are intended to encompass equivalents thereof.

What is claimed is:

1. An apparatus, comprising:
an optical source; and
an optical polarization rotator being configured to receive light from the optical source, the optical polarization rotator including first and second optical waveguide ribs located along a planar surface of a substrate, the second optical waveguide rib being located farther from the surface than the first optical waveguide rib; and
wherein first segments of the optical waveguide ribs form a vertical stack over the substrate and second segments of the optical waveguide ribs are offset laterally in a direction along the surface; and
wherein the first and second optical waveguide ribs are formed of materials with different bulk refractive indexes.

2. The apparatus of claim 1, further comprising a spacer layer being located between the first and second optical waveguide ribs and being formed of a material with a different bulk refractive index than the materials of the first and second optical waveguide ribs.

3. The apparatus of claim 2, wherein the spacer layer is vertically thinner than the first optical waveguide rib.

4. The apparatus of claim 1, wherein the first optical waveguide rib is formed of a same material as a portion of the planar surface of the substrate.

5. The apparatus of claim 1, wherein one of the optical waveguide ribs is formed of a semiconductor and the other of the optical waveguide ribs is formed of a dielectric.

6. The apparatus of claim 1, wherein the optical polarization rotator is configured to rotate a polarization of received linearly polarized light by at least 45 degrees.

7. The apparatus of claim 1, further comprising a transition region in which the first optical waveguide rib has a width lateral to the surface that monotonically tapers from a larger value at an input planar optical waveguide to a smaller value at the first segment of first optical waveguide rib.

8. The apparatus of claim 7, wherein the second optical waveguide rib has a width lateral to the surface that monotonically tapers from a smaller value at an end thereof nearer to the input planar optical waveguide to a larger value at the first segment of the second optical waveguide rib.

9. The apparatus of claim 1, further comprising
an optical modulator having a 1×2 optical splitter, first and second optical waveguide arms, and a 2×1 optical combiner, each optical waveguide arm connecting a corresponding optical output of the 1×2 optical splitter to a corresponding optical input of the 2×1 optical combiner; and
wherein each optical waveguide arm includes an electro-optical modulator capable of modulating the phase and/or amplitude of light propagating there through responsive to electrical signals received therein; and
wherein an optical polarization rotator is located in one of the optical waveguide arms.

10. The apparatus of claim 1, wherein optical polarization rotator is configured to receive laser light from the optical source.

11. The apparatus of claim 1, wherein optical polarization rotator is configured to receive linearly polarized light from the optical source.

12. An optical receiver, comprising:
a polarization beam splitter having first and second optical outputs; and
an optical polarization rotator including first and second optical waveguide ribs located along a planar surface of a substrate, the second optical waveguide rib being located farther from the surface than the first optical waveguide rib; and wherein first segments of the optical waveguide ribs form a vertical stack over the substrate and second segments of the optical waveguide ribs are offset laterally in a direction along the surface;

wherein the first and second optical waveguide ribs are formed of materials with different bulk refractive indexes; and wherein the first optical output of the polarization beam splitter is connected to transmit light to the first optical waveguide rib and the second optical output of the polarization beam splitter is connected to transmit light to a third optical output.

13. The optical receiver of claim 12, wherein the optical polarization rotator is connect to transmit light to a fourth optical output; and wherein the optical receiver is configured to transmit light of substantially the same linear polarization to the third and fourth optical outputs.

14. The optical receiver of claim 13, further comprising:

a first optical demodulator connected to receive light from the third optical output; and a second optical demodulator connected to receive light from the further optical output.

* * * * *